United States Patent [19]
Demirdogen et al.

[11] Patent Number: 5,647,712
[45] Date of Patent: Jul. 15, 1997

[54] ONE DIRECTIONAL SOCKET-DRIVEN COMPONENT

[75] Inventors: A. Caner Demirdogen; Paul D. Miller, both of Cookeville, Tenn.

[73] Assignee: Fleetguard, Inc., Nashville, Tenn.

[21] Appl. No.: 644,045

[22] Filed: May 9, 1996

[51] Int. Cl.⁶ .......................... F16B 23/00; F16B 35/06
[52] U.S. Cl. ........................ 411/404; 411/911; 411/919
[58] Field of Search ............................ 411/402, 403, 411/404, 406, 410, 911, 919

[56] References Cited

U.S. PATENT DOCUMENTS

| | | |
|---|---|---|
| 1,506,500 | 8/1924 | Ripamonti et al. |
| 3,161,450 | 12/1964 | Goodenough . |
| 3,253,625 | 5/1966 | Oestereicher . |
| 3,313,198 | 4/1967 | Walton .................... 411/919 X |
| 3,673,912 | 7/1972 | Herr . |
| 4,429,599 | 2/1984 | La Sante, Sr. ............ 411/911 X |
| 5,171,117 | 12/1992 | Seidl ............................ 411/404 |

FOREIGN PATENT DOCUMENTS

| | | |
|---|---|---|
| 2334871 | 7/1977 | France ........................ 411/406 |
| 0 584 118 | 12/1977 | U.S.S.R. . |
| 1 420 092 | 1/1976 | United Kingdom . |
| 2 036 907 | 7/1980 | United Kingdom . |
| 2 149 872 | 6/1985 | United Kingdom . |

Primary Examiner—Neill R. Wilson
Attorney, Agent, or Firm—Woodard, Emhardt, Naughton, Moriarty & McNett

[57] ABSTRACT

A threaded fastener which is constructed to be turned in one direction by a square socket drive includes a threaded stem and an integral modified head arranged with four raised projections which are circumferentially spaced. Each of the four raised projections includes a substantially flat wall portion and a curved and inclined ramp portion. The four flat wall portions effectively define a square center region which is compatibly sized to receive a one-half inch square socket drive. Rotation of the square socket drive in a counterclockwise direction causes the sides of the square socket drive to engage the flat wall portions so as to turn the threaded fastener in a counterclockwise direction. Any attempt to rotate the square socket drive in a clockwise direction causes the sides of the square socket drive to ride up along the ramp portions and ride out of engagement with the modified head of the threaded fastener. In a related embodiment of the present invention, the four raised projections have their orientation reversed so that the square socket drive is effective to threadedly advance the fastener when the drive is turned in a clockwise direction. Likewise, in this alternate embodiment, when the square socket drive is turned in a counterclockwise direction, it rides up along the ramp portions and come out of engagement with the modified head. As described, the present invention includes a one directional threaded fastener which is manipulated by a square socket drive.

37 Claims, 8 Drawing Sheets

ONE DIRECTIONAL SOCKET-DRIVEN COMPONENT

BACKGROUND OF THE INVENTION

The present invention relates in general to the design of socket-driven components, typically threaded, which are used in mechanical assemblies to close containers and to attach and secure components in position. More specifically, the present invention relates to the head design for such socket-driven components whereby the component is made one directional when it is to be advanced or removed by means of some hand tool or instrument. The present invention may be incorporated as part of a threaded fastener, a threaded plug, or a threaded lid. Alternatively, the present invention may be incorporated as part of a component which is not threaded, such as a component with a quarter-turn bayonet retaining mechanism. When threaded, the threads may be internal or external in any of the described applications.

Conventional threaded fasteners include a generally cylindrical threaded body and an integral head at one end of the threaded body. There are numerous options for the thread design, including variations in the thread sizes, pitch, and shape. As for the head design, the conventional styles for screws are slotted and cross-recessed or Phillips. Bolts are typically stylized with a hex head or an Allen-socket design. The hand tools used to tighten and/or remove these threaded fasteners are dictated by the particular head design. A screwdriver of either a flat blade or Phillips style is typically used for advancing and removing screws, while a drive socket or wrench is typically used for hex head bolts. An Allen wrench is typically used for an Allen-socket design.

As will be understood, each of the four typical styles of threaded fasteners are intended to be advanced in a clockwise tightening direction as well as removed in a counterclockwise loosening direction. Accordingly, the head designs and the corresponding hand tools for those head designs are configured so as to turn the threaded fasteners in both clockwise as well as counterclockwise directions. In this way, a single, common hand tool is used to both install and remove the threaded fastener. When the present invention is incorporated as part of a plug or lid, the same one directional head design concept is used. The installation options and removal options are the same as with a threaded fastener, depending on the specific head design.

It is envisioned that there are particular applications when it will be desired to restrict the rotation of the component or fastener to only one direction, either clockwise or counterclockwise. For example, if it is desired to prevent the removal, by conventional hand tools or instruments, of a fastener which is tightened in place, the head of the fastener can be made one directional according to the present invention. Likewise, if it is desired to limit how tightly a fastener may be installed, it is envisioned that the head of the fastener and a corresponding hand tool would be designed so that the fastener has to be advanced and tightened by hand, without the use of a conventional hand tool or instrument. The hand tool is then used only for removal, i.e., a one directional design.

According to the present invention, a threaded component, such as a fastener, plug or lid is designed with a head style that is one directional and able to be turned by a square socket drive. In one configuration, this one direction is the clockwise direction for advancing and tightening the fastener, for example, by use of the square socket drive. With this design configuration, the fastener is not able to be removed by a conventional hand tool. In the other primary configuration of the present invention, the one directional fastener head is configured for counterclockwise movement for loosening and removing the fastener. With this design, the fastener would typically be advanced and tightened in place by hand, as conventional hand tools would not be effective due to the special head design according to the present invention. In the counterclockwise design, the threaded fastener may also be advanced and tightened in place by a limited purpose, special instrument which would not typically be available to individuals and personnel who may be in a position to loosen or remove the threaded fastener. This would allow the threaded fastener to be installed and tightened to the degree that it could not be removed manually. With the special head design according to the present invention, the square socket drive would then be the means to remove the threaded fastener by rotating the fastener in a counterclockwise direction. However, the square socket drive would not be effective to threadedly advance the threaded fastener. Consequently, once the threaded fastener was tightened to the desired degree, by use of a special instrument, it could not be tightened to any greater degree by the square socket drive, thereby ensuring that the initially set torque on the threaded fastener would not be exceeded.

One specific application for the present invention is to incorporate the modified head design into a lid which is used on a filter canister. While the lid is intended to be and actually can be easily installed manually, there is a rubber O-ring seal between the lid and filter canister which expands during use. This O-ring expansion causes a tighter engagement between the lid and filter canister making it difficult to manually remove the lid. With the modified head design of the present invention, a square socket drive can be used to remove the lid. The use of a square socket drive imparts greater torque on the lid, enabling the lid to be unscrewed from the canister.

Over the years threaded fasteners have been designed with modified heads in an effort to limit or restrict the direction of rotation of the corresponding fastener. The following listing of United States patents, foreign patents, and foreign applications provides a representative sampling of these earlier design efforts:

| U.S. PATENT REFERENCES | | |
| --- | --- | --- |
| U.S. Pat. No. | PATENTEE | ISSUE DATE |
| 1,506,500 | Ripamonti et al. | Aug. 26, 1924 |
| 3,161,450 | Goodenough | Dec. 15, 1964 |
| 3,253,625 | Oestereicher | May 31, 1966 |
| 3,673,912 | Herr | Jul. 4, 1972 |

| FOREIGN PATENT REFERENCES | | |
| --- | --- | --- |
| REFERENCE NO. | COUNTRY | DATE |
| 1 420 092 | Great Britain | Jan. 7, 1976 |
| 2 036 907 A | United Kingdom | Jul. 2, 1980 |
| 2 149 872 A | United Kingdom | Jun. 19, 1985 |
| 0 584 118 (SU 197712) | Soviet Union | Dec. 1, 1977 |

In several of the designs disclosed by the foregoing list of references, a modified socket shape is provided. Generally, the recessed shape has a series of driving walls and an alternating series of releasing walls. The releasing walls prevent the unauthorized removal of the threaded fastener, see for example U.K. application No. 2 149 872. In other designs, two raised portions are provided to enable conventional advancing but removal only by means of a special tool, see the Herr patent.

Even with these various earlier designs, no one has yet created a head design for a threaded fastener which is one directional in nature and able to be advanced (in one style) or removed (in an alternative style) by means of a square socket drive. This particular combination is provided by the present invention.

The use of a square socket drive provides a number of advantages over other one directional head designs for threaded fasteners. The head design of the present invention provides four, spaced-apart flat walls for use with a square socket drive for either driving advancement or removal, thereby creating a more balanced and more evenly distributed load on the head of the fastener. A square socket drive represents a conventional and readily available hand tool, thereby precluding the need for custom designed or non-conventional hand tools. Accordingly, the present invention represents a novel and unobvious design.

SUMMARY OF THE INVENTION

A threaded component which is constructed to be turned in one direction by a square socket drive according to one embodiment of the present invention comprises a modified head and a threaded component body which is integral with the modified head. The modified head includes a base and four circumferentially-spaced, raised projections extending away from the base. Each raised projection includes a substantially flat wall portion and a curved ramp portion. The four flat wall portions are constructed and arranged to define a substantially square recess which is substantially centered relative to the base. The four flat wall portions provide abutment surfaces for the square socket drive whereby the square socket drive is able to contact the four flat wall portions for turning of the threaded component in a first direction. The four curved ramp portions provide cam surfaces in order to prevent the turning of the threaded component by the square socket drive in a second direction which is the reverse of the first direction.

One object of the present invention is to provide an improved threaded component with a one directional head design.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
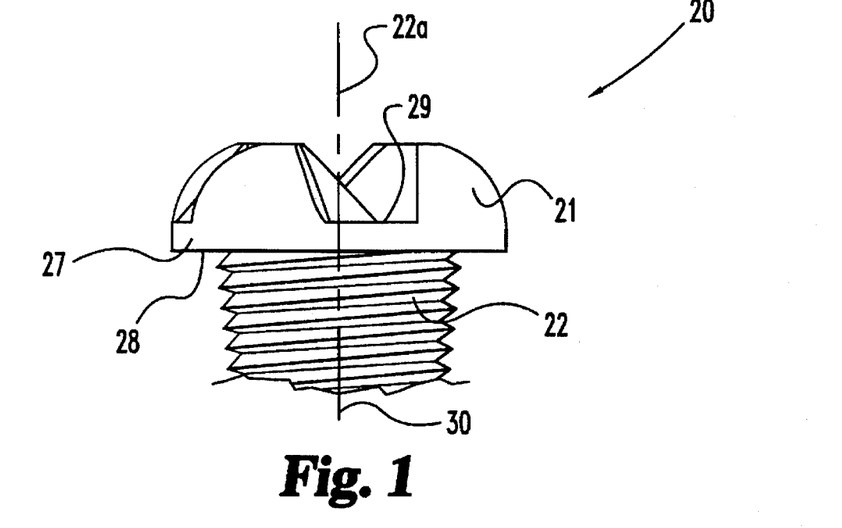
FIG. 1 is a front elevational view of a one directional threaded fastener according to a typical embodiment of the present invention.
Figure 2:
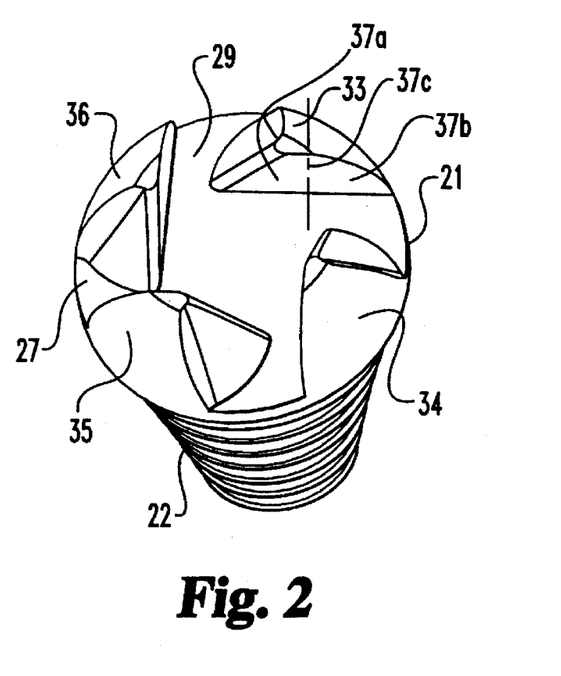
FIG. 2 is a partial, top perspective view of the FIG. 1 threaded fastener.
Figure 3:
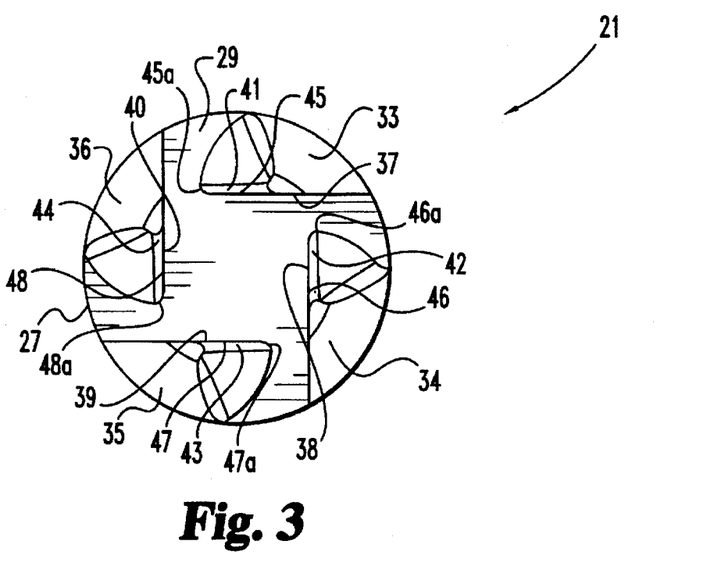
FIG. 3 is a top plan view of the FIG. 1 threaded fastener.

Referring to FIGS. 1–3, there is illustrated a threaded fastener 20 with a modified head 21 and unitary threaded stem 22. The thread style illustrated for stem 22 is an external, unified thread, which can be virtually any size, pitch, and length. The specific style of stem 22 is not critical to the present invention as the novelty resides primarily in the design of modified head 21. Some of the novelty also resides in the material options which are enabled by the present invention as will be explained hereinafter. As will be understood, the preferred embodiment of the present invention involves the use of a one-half inch square socket drive which is used in the modified head 21 in order to rotate the threaded fastener 20. Use of a one-half inch square socket drive requires a head size of a minimum diameter and accordingly, there would be a preferred size range for the threaded stem from the standpoint of ratios and proportions. However, if threaded fastener 20 is designed to be turned by means of a differently sized square socket drive, the required minimum diameter for the modified head 21 could, and in most instances would, be different. As a result, the preferred size for the threaded stem would also be different, either larger or smaller, assuming that the preferred ratios and proportions between the head and stem of the threaded fastener are generally maintained.

It is also to be understood that the external thread style on stem 22 can be varied. The unified thread can be coarse or fine, the thread can be styled as a machine screw or a wood screw or even a sheet metal or self-tapping screw. Threaded fastener 20 can be a bolt instead of a screw with the same options for the size, pitch, and length.

Fastener 20 is a unitary member, which can be fabricated out of metal or polymeric material. One of the advantages of using a square socket drive is the amount of torque which can be applied to the threaded fastener and the balancing and distribution of the forces imparted by the square socket drive to the modified head 21. As will be explained hereinafter, the design of the modified head 21 and the four raised projections which are part of the modified head provide a larger contact area for the square socket drive. This larger contact area enables the forces from the square socket drive to be transferred over a larger portion of the head, thereby reducing the load at any single or concentrated point. This increases the torque carrying capacity of the fastener and allows the fastener to be made out of a polymeric material instead of metal. If the loosening or tightening forces were more concentrated, a stronger material, such as metal, would be required in order to prevent fracture or shear of those portions of the head acted upon by the tightening or loosening tool. By distributing and balancing those forces over a greater surface area, the stress concentration at any one point is lessened, allowing materials with less strength than metal to be used.

The threaded stem 22 has a slight chamfer at its free end (not illustrated) as a lead in to the corresponding nut or tapped hole into which the fastener is threaded. The longitudinal axis of stem 22 is defined by line 22a. The modified head 21 includes a base 27 with a substantially flat lower surface 28 and a substantially flat upper surface 29 which is substantially parallel to the lower surface 28. This results in a base 27 which has a substantially uniform thickness throughout. Surfaces 28 and 29 are substantially circular and concentric. The common centerline axis for surfaces 28 and 29 is denoted by line 30. Line 30 is coincident with line 22a and accordingly the stem 22 is substantially concentric with base 27.

Extending upwardly, away from surface 29 are four substantially identical projections 33–36 which are equally spaced approximately 90 degrees apart. The size, shape, and geometry of each projection 33–36 is substantially the same and each of these four projections has substantially the same relative position relative to base 27. By considering base 27 as divided or segmented into four identical 90 degree quadrants, there is one projection 33–36 positioned in each one of the four quadrants. The specific placement and orientation of each projection within each quadrant is substantially the same.

Referring specifically to FIG. 3, it can be seen that each projection 33–36 has a substantially flat and corresponding wall portion 37–40 and a corresponding radiused, ramp portion or inclined wall portion 41–44. Separating each inclined wall portion 41–44 from each corresponding flat wall portion 37–40 is an inclined edge 45–48, each edge blending into a corresponding rounded or radiused tip 45a–48 a. There is one rounded or radiused tip 45a–48a associated with each wall portion 41–44 of each corresponding projection 33–36. The four flat wall portions 37–40 are arranged so as to be parallel and perpendicular to each other. As illustrated, flat wall portions 37 and 39 are substantially parallel to each other. Flat wall portions 38 and 40 are substantially parallel to each other. Further, flat wall portions 37 and 39 are substantially perpendicular to flat wall portions 38 and 40.

If raised projection 33 is used for reference as being typical of all four projections, it is to be noted that flat wall portion 37, also typical of the remaining three flat wall portions, effectively has a functional portion 37a (see FIG. 2) and a non-functional portion 37b which are generally partitioned by an imaginary dividing line which is represented by broken line 37c. As will be clear from the disclosure of the present invention, broken line 37c is generally coincident with the imaginary geometric plane which is coincident with flat wall portion 38. This particular pattern or relationship is repeated throughout the entirety of modified head 21. In other words, the geometric plane which includes flat wall portion 39 would extend into flat wall portion 38 at a location which would approximate the dividing line between the functional portion of wall 38 and the non-functional portion. As indicated, this pattern is repeated for the remaining projections.

Figure 4:
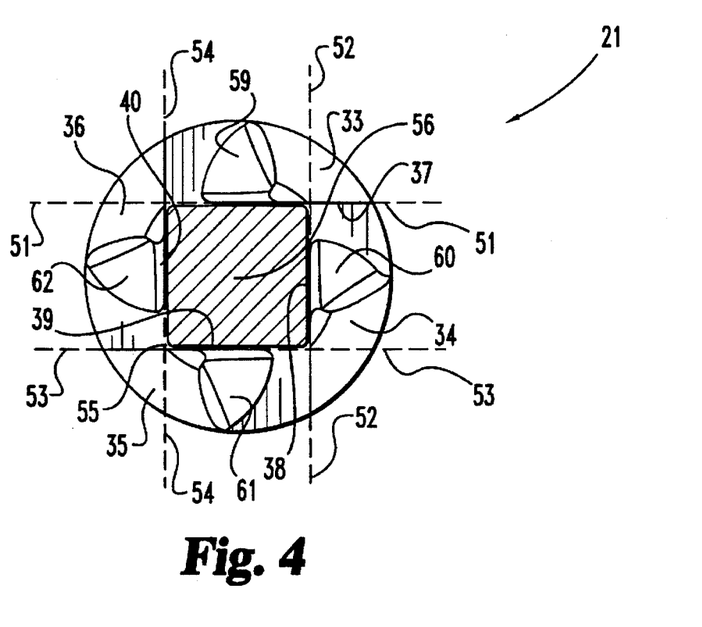
FIG. 4 is a top plan view of the FIG. 1 threaded fastener with a diagrammatic square socket drive inserted into a defined space.

Continuing with the concept of imaginary geometric planes which are drawn so as to coincide with each of the four flat wall portions 37–40, these imaginary geometric planes intersect each other and in so doing, define an interior, substantially square region. This is illustrated in FIG. 4, wherein broken lines 51–54 define the aforementioned imaginary geometric planes. Substantially square region 55 is the result of the intersection of these four imaginary geometric planes.

In the preferred embodiment, the substantially square region 55 measures approximately 0.510 inches on a side. Accordingly, when a one-half inch square socket drive is inserted into region 55 as is diagrammatically represented by square 56 in FIG. 4, there is an approximate 0.005 inch clearance on each side between the walls of region 55 and the sides of the square socket drive. Although this clearance is relatively small, it is sufficient to permit the inserted square socket drive (square 56) to turn slightly in a counterclockwise direction before the corners of the square socket drive contact the flat wall portions 37–40 of projections 33–36. As each corner and side of the square socket drive pivots or rotates in a counterclockwise direction around the axis of rotation of the square socket drive, each corner and side moves closer to the nearest flat wall portion until the four corners of the square socket drive abut up against the corresponding flat wall portions. Due to the symmetry and uniform geometry of modified head 21, and the substantially identical construction of the four projections 33–36, the areas of the four corners of the square socket drive engage the corresponding flat wall portions 37–40 in a uniform and balanced fashion. The FIG. 4–6 drawing illustrations can be considered as diagrammatic because no dimensional scale has been followed.

Figure 5:
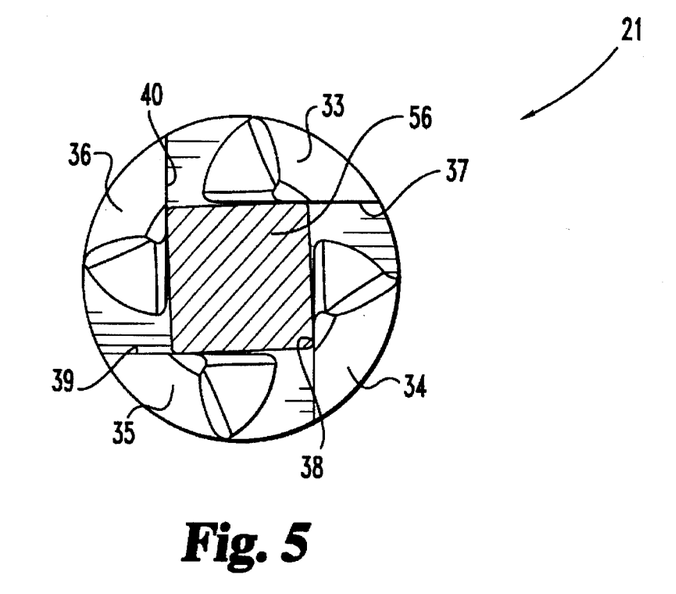
FIG. 5 is a top plan view of the FIG. 1 threaded fastener with the square socket drive rotated into abutment with four wall portions of the head of the FIG. 1 threaded fastener.

As can be seen in the FIG. 5 illustration, the counterclockwise rotation or turning of the square socket drive causes each corner area of the square socket drive to engage a different one of the flat wall portions 37–40. The torque induced by the square socket drive by any continued attempt to turn the square socket drive in a counterclockwise direction imparts a loosening or untightening force through each corner area against each corresponding flat wall portion. These forces, assuming a high enough torque on the square socket drive, are thus able to turn the threaded fastener in a counterclockwise direction. With conventional threads, a counterclockwise direction represents an unscrewing or unfastening direction of movement. A clockwise direction represents a tightening or advancing direction or movement.

As described, each projection 33–36 includes a curved and inclined ramp portion or inclined wall portion 41–44, respectively. The inclined wall portions 41–44 each terminate at base 27 adjacent to their corresponding radiused tips 45a–48 a. Each inclined edge 45–48 has an upward angle of incline which substantially coincides with the angle of incline of each wall portion 41–44. In the preferred embodiment the angle of incline of wall portions 41–44 is approximately 47 degrees. The presence of inclined wall portions 41–44 and inclined edges 45–48 provides an important feature to the modified head 21 which makes it one directional. These four inclined wall portions 41-44 in cooperation with inclined edges 45-48 allow the square socket drive to easily slide and ride upwardly over the inclined wall portions 41-44 when the square socket drive is rotated in a clockwise direction.

Figure 6:
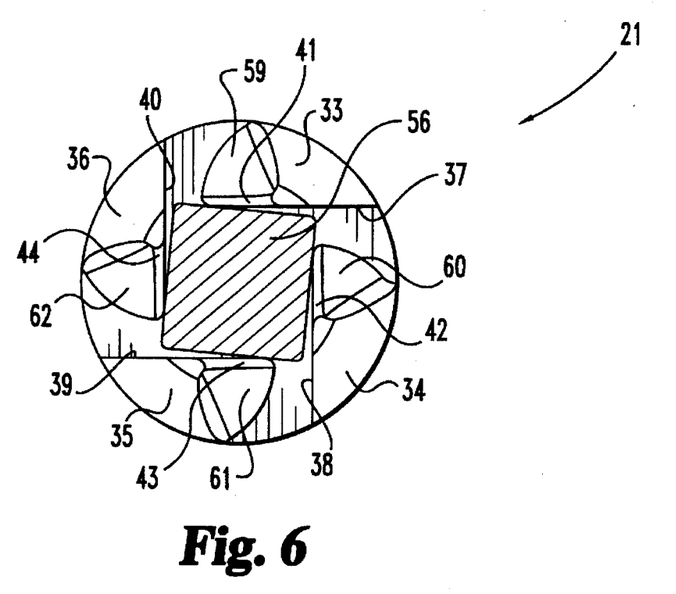
FIG. 6 is a top plan view of the FIG. 1 threaded fastener with a square socket drive inserted and rotated in a clockwise direction.

As can be seen in the FIG. 6 illustration, if the square socket drive is turned in a clockwise direction, each of the corners of the square socket drive are rotated into contact with a corresponding one of the curved and inclined wall portions 41-44. The inclined orientation of each wall portion 41-44 begins at the upper surface 29 of base 27. According to the present invention, and with specific reference to the design of modified head 21, with continued clockwise torque applied to the square socket drive, the sides of the square socket drive begin to ride up along their corresponding inclined wall portions (ramps) 41-44. The result is to create a cam-like action which pushes the square socket drive upwardly and out of any turning engagement with raised projections 33-36. With the square socket drive disengaged from the raised projections, it is not possible to advance or tighten the threaded fastener 20 by means of the square socket drive. The square socket drive is only usable to unscrew or remove the threaded fastener.

With regard to the forty-seven degree angle on inclined wall portions 41-44, while this angle may be varied, the following should be understood. The higher or larger the angle of incline, the greater the amount of torque which will be transferred from the square socket drive to the modified head when the square socket drive is rotated in the clockwise direction. Although ultimately the square socket drive will slip out of the modified head due to the cam action, the issue is how much torque one wishes to apply so as to turn the threaded fastener in a direction which is not desired. By reducing this angle of incline, less torque will be transmitted and thus the one directional nature of the present invention will be achieved. However, when the angle is reduced, the flat wall area of walls 37-40 is also reduced for the same diameter size of the modified head. A reduction in the size of the functional area of the flat wall portions means that there will be less area over which to distribute the turning forces from the square socket drive. Accordingly, in between the two extremes, the angle of forty-seven degrees has been selected as a good balance.

Threaded fastener 20 is used when it is desired to control the amount of tightening so that the fastener is not over-torqued. The fastener is manually tightened and the square socket drive is used to remove the fastener. While it might be considered to use a gripping pair of pliers or possibly a special wrench in order to turn the threaded fastener, the outer surfaces of projections 33-36 are rounded and blend into base 27 so that gripping of the modified head 21 is difficult at best and unlikely to enable a secure enough grip which would be suitable to actually turn the threaded fastener 20.

It will also be pointed out with regard to the four projections 33-36 that the back side or relief wall portions 59-62 are effectively non-functional in nature. These back side relief wall portions simply provide a clearance for the square socket drive. With threaded fastener 20, which is designed for square socket drive removal, it is desired to have the square socket drive ride up and out of engagement with the modified head when turned in a clockwise direction. In order for the sides of the square socket drive to ride up along the inclined wall portions 41-44, some clearance is needed for the square socket drive to turn and this is provided by the back side relief wall portions 59-62.

It should also be understood that straight slotted or cross-recessed (Phillips) screwdrivers are not suitable to advance and tighten threaded fastener 20. The only straight slots present in modified head 21 are disposed between adjacent raised projections 33-36 and defined by the flat wall portion of one projection and by the curved and inclined wall portion of the adjacent projection. If a straight slotted screwdriver is placed between a pair of adjacent projections, the inclined ramp (inclined wall portions 41-44) prevents use of the screwdriver to advance the threaded fastener. There is even less compatibility between the modified head 21 and a cross-recessed or Phillips screwdriver.

If the threaded fastener 20 is tightened manually, the square socket drive provides a quick and efficient means of removal. There is nothing else as far as conventional hand tools which can be used to remove the fastener. As previously mentioned, it would be possible to configure a special tool or device for tightening the threaded fastener 20 to a degree or extent greater than what would be possible by merely manual tightening. This could be done in those situations where a specific tightening torque is desired and once established, the only manipulation which would be permitted by other personnel would be to use a square socket drive to remove the threaded fastener.

With continued reference to FIGS. 1-3, there are other characteristics of modified head 21 which should be mentioned. As already suggested, the area of the flat wall portions 37-40 is important in that this is the area contacted by the square socket drive and these are the areas that accept and distribute the load or torque from the drive. The area of contact reduces any localized stress concentration and to some extent the larger the area of these flat wall portions, the higher the torque the fastener can accommodate or carry, limited by the point at which threads would strip or the threaded stem would fracture.

Each inclined wall portion 41-44 is radiused at approximately 0.03 inches. This radiused curvature existing throughout the length of inclined wall portions 41-44 corresponds to the radius of tips 45a-48 a. This radius curvature enables the sides of the square drive to slide out more easily.

With regard to the gap separation between adjacent raised projections, which would typically be the distance between the flat wall portion of one projection and the radiused tip of the adjacent projection, this dimension is not critical, through some gap separation is necessary. Although set at approximately ⅛ of an inch in the preferred embodiment, this separation can be larger or smaller than this dimension. The overall height of each raised projection from the top surface of the base upwardly, is approximately ¼ of an inch. This dimension is important in that it helps to define the overall area of the flat wall portions which will be engaged by the square socket drive. The greater the area of contact between the square socket drive and the flat wall portions, the greater the distribution of the turning or rotating torque and the greater the torque the threaded fastener can handle.

Figure 7:
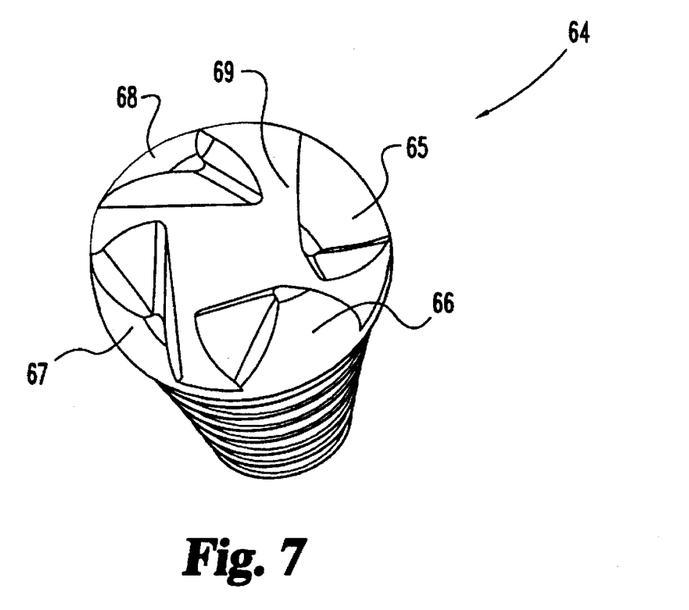
FIG. 7 is a partial, top perspective view of a one directional threaded fastener according to another embodiment of the present invention.
Figure 8:
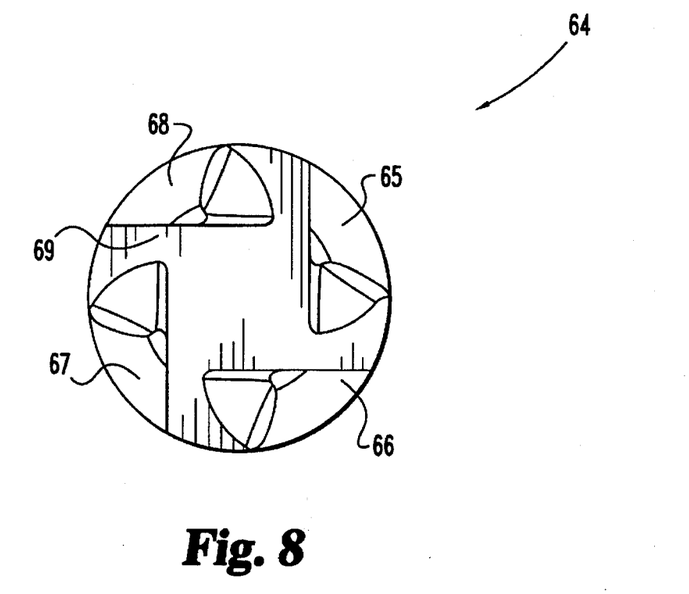
FIG. 8 is a top plan view of the FIG. 7 threaded fastener.

Referring now to FIGS. 7 and 8, the reverse of FIGS. 1-3 is illustrated. While threaded fastener 20 is manually advanced and then removed by a square socket drive, threaded fastener 64 is designed to be advanced by a square socket drive, though not removed by the same square drive. To achieve this design objective, the four projections 65-68 of modified head 69 are reversed from the design of projections 33-36 by interchanging the location of the flat wall portion on each projection with the location of the back side wall portions and the inclined wall portions. A comparison between FIGS. 1-3 and FIGS. 7 and 8 will reveal the interchanged locations of the flat wall portions, the inclined wall portions, and the back wall portions. However, the individual raised projections 65–68 are virtually identical as to the remainder of their geometry with projections 33–36. Additionally, the balance of threaded fasteners 20 and 64 are virtually identical to each other.

All of the descriptions and teachings with regard to threaded fastener 20 are equally applicable to threaded fastener 64 with the exception that threaded fastener 64 is designed to be advanced and turned in a clockwise direction by a square socket drive. Accordingly, threaded fastener 64 is designed so that the square socket drive is not effective to remove or unscrew the threaded fastener.

In the preferred embodiments, the modified head and stem are preferably cast or molded. While the modified head can be machined into the desired configuration, that is not the easiest nor the most cost effective manufacturing method.

Figure 9:
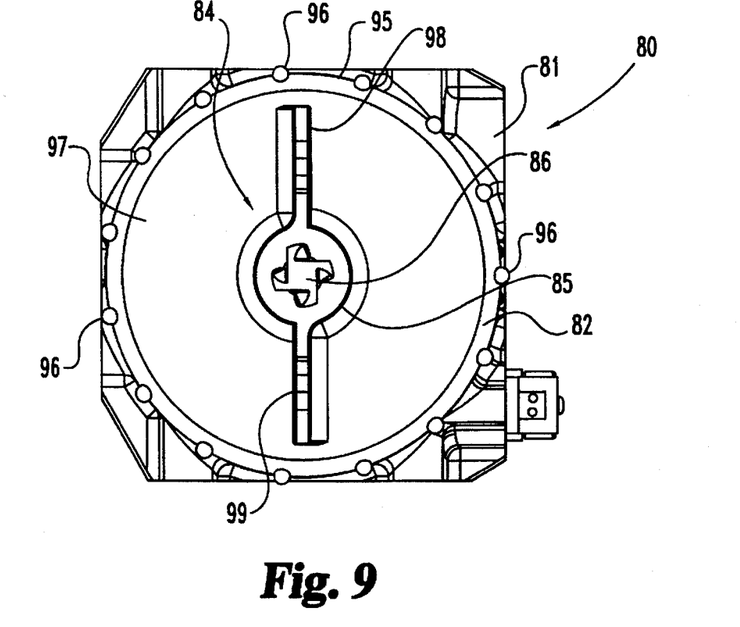
FIG. 9 is a top plan view of a threaded component, styled as a canister lid, as assembled to a filter canister, according to a typical embodiment of the present invention.
Figure 10:
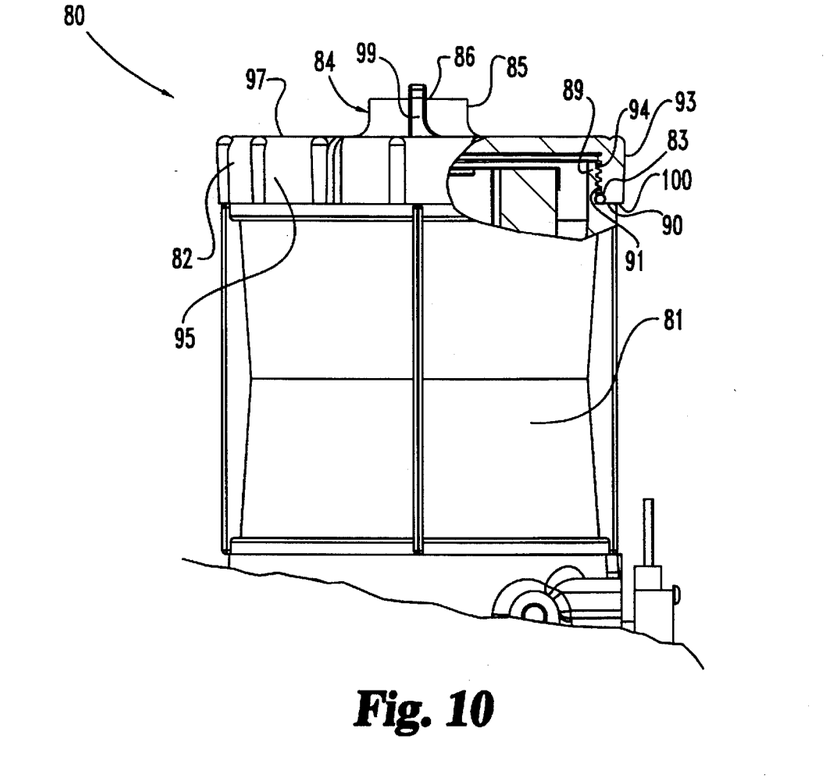
FIG. 10 is a partial, fragmentary front elevational view of the FIG. 9 canister lid and corresponding filter canister.

While the focus of FIGS. 1–8 is on the design of a threaded fastener with a modified head, the teachings of the present invention can be utilized for other threaded components such as a lid. Referring to FIGS. 9 and 10, a fluid filter assembly 80 is illustrated in partial form. Filter assembly 80 includes a canister 81, lid 82, and sealing O-ring 83. Lid 82 has been designed with a modified stem 84 which is configured as a substantially cylindrical raised boss 85 which has a uniquely shaped recess 86 formed downwardly therein.

The specifics of filter canister 81 which are not illustrated are not believed to be relevant for an understanding of the present invention. What is relevant is to understand that the canister 81 includes an externally threaded upper wall 89 and a substantially horizontal shelf 90 positioned below the series of external threads 91. O-ring 83 is located at the corner defined by wall 89 and horizontal shelf 90.

Lid 82 includes a generally cylindrical outer wall 93 which includes a series of internal threads 94. The outer surface 95 of wall 93 includes an equally spaced series of axial ribs 96. The top surface 97 includes integral boss 85 and integral manual tightening ribs 98 and 99. In the preferred embodiment of lid 82, lid 82 is a unitary member which is molded out of plastic. Accordingly, the two tightening ribs 98 and 99 are unitary with the top surface 97 and unitary with the raised boss 85. The external threads 91 and the internal threads 94 are sized so as to be mutually engageable for the threaded assembly of the lid 82 onto the canister 81.

As the lid is threaded onto the canister and advanced axially downward, the lower edge 100 of the lid 82 is drawn into engagement against the O-ring 83. Compression of the O-ring 83 into the defined corner by means of the lower edge 100 creates a fluid-tight interface at that location such that the O-ring 83 is able to seal the interface against any fluid leakage between the canister and the lid.

As will be explained in greater detail hereinafter, the recess 86 of the raised boss 85 is shaped with four equally spaced projections 103–106 which have substantially the same geometry as projections 33–36 (see FIG. 11). In use, lid 82 is manually threaded onto the open end of canister 81 so as to seal the open end closed. The threaded engagement between the lid and the canister compresses the O-ring 83 for an air-tight seal, since the inside of the canister is below atmospheric pressure. The tightening ribs 98 and 99 may be used for manually threading the lid onto the canister. Alternatively, the outer ribs 96 may be used for this purpose.

When the closed fluid filter assembly is put into service, the O-ring 83 expands in size and creates a type of preload on the threaded engagement between threads 91 and threads 94. This preload has the effect of locking the lid onto the canister in a secure and tight fashion to the point that it is extremely difficult and may be virtually impossible to remove the lid 82 from the canister 81 by hand. This is where the four projections 103–106 come into play. By configuring these four projections in a manner which is virtually identical to projections 33–36, and by arranging projections 103–106 so as approximate modified head 21, a square socket drive is able to be used in order to remove the lid 82 from the canister 81. The square socket drive is able to provide the requisite torque to the lid so as to overcome the preload on the threads due to the expanded O-ring seal. The square drive is simply inserted down into recess 86 and operated as has been described with regard to FIGS. 4 and 5.

There may be a situation where a user of the lid and canister combination would try to assemble the lid by using a square drive. The risk with this approach would be overtightening of the lid onto the canister. If a regular square socket was provided which would permit rotation of the lid in either a clockwise or counterclockwise direction, no doubt certain users would try to thread the lid onto the canister by using a square drive. The risk of overtightening is substantial and even if a torque specification was provided, experience shows that those safe ranges are often exceeded or ignored. The problem with overtightening the lid onto the canister becomes significant when the O-ring seal swells and expands during use. This simply adds an additional preload on whatever tightness is already in existence between the lid and the canister threads and it might not be possible to remove the lid, without damaging the lid or canister, even with the square drive. Accordingly, it is envisioned that the lid would be manually threaded onto the canister and in order to preclude any attempt to use a square drive to attach the lid, the four projections 103–106 are configured similar to projections 33–36 so that the square drive is only suitable to rotate the lid in a counterclockwise direction. If a square drive is inserted into recess 86, it is not able to turn the lid 82 in a clockwise direction. As previously described, any attempt to use a square drive to turn the lid in a clockwise direction causes the square drive to ride up and out of engagement with the four projections 103–106. The only direction where the square drive will be usable with regard to projections 103–106 is in the counterclockwise direction. As is clearly indicated from the foregoing description, the one directional nature of lid 82 is created by the design of recess 86 and the four projections 103–106 which are located in recess 86.

Figure 11:
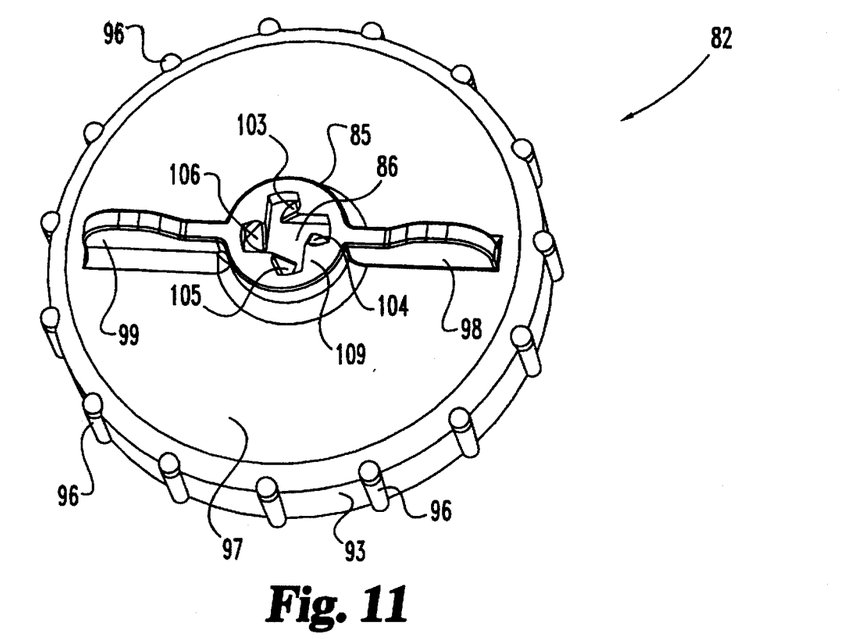
FIG. 11 is a perspective view of the FIG. 9 canister lid.

With reference to FIG. 11, outer wall 109 defines recess 86 and the projections 103–106 extend inwardly from outer wall 109. The orientation, size, spacing, and geometry of projections 103–106 are virtually identical to projections 33–36 with the exception that the outermost circumferential surface of projections 103–106 is integral with outer wall 109. In other words, the four projections appear as if they are inwardly directed extensions of the inside surface of outer wall 109. This is in contrast to projections 33–36 which were three dimensional forms without any integral connection except to the base of the modified head.

While still following the same concept, theory, and teachings of the present invention, as have been described, other designs for the four projections are envisioned. It is contemplated that the specific geometry of the four projections can be changed somewhat to create different consequences, including the relative ease or difficulty in creating the projections in (or on) the raised boss on the top surface of the threaded lid. It is also to be noted, and as previously described, that the particular angle of incline on the inclined wall portion will have an effect on the degree or extent of torque which can be applied in a clockwise direction even though the square drive is intended to ride up and out of the recess when turned in a clockwise direction. As would be understood from basic vector analysis, if the inclined wall portions have some vertical component, there can be some modest amount of torque applied to the lid in a clockwise direction. However, when that torque is exceeded, the square drive rides up and out of the corresponding recess.

Referring to FIGS. 12–15, four other styles of threaded lids are illustrated. Each lid 111, 112, 113, and 114 is virtually identical to lid 82 in size, shape, and configuration. The one exception to the otherwise virtually identical configuration of lids 82 and 111–114 is their specific style of corresponding recess. The four recesses 115, 116, 117, and 118 which correspond with lids 111–114, respectively, each possess a slightly different projection geometry from lid 82 and from each other. Each corresponding raised boss 119, 120, 121, and 122 is the same as far as their size, shape, and relationship to the remainder of the corresponding lid. The only difference between these four alternative lids relative to each other and to lid 82 is the specific geometry of the projections and surfaces disposed in the recess of each raised boss.

Figure 12:
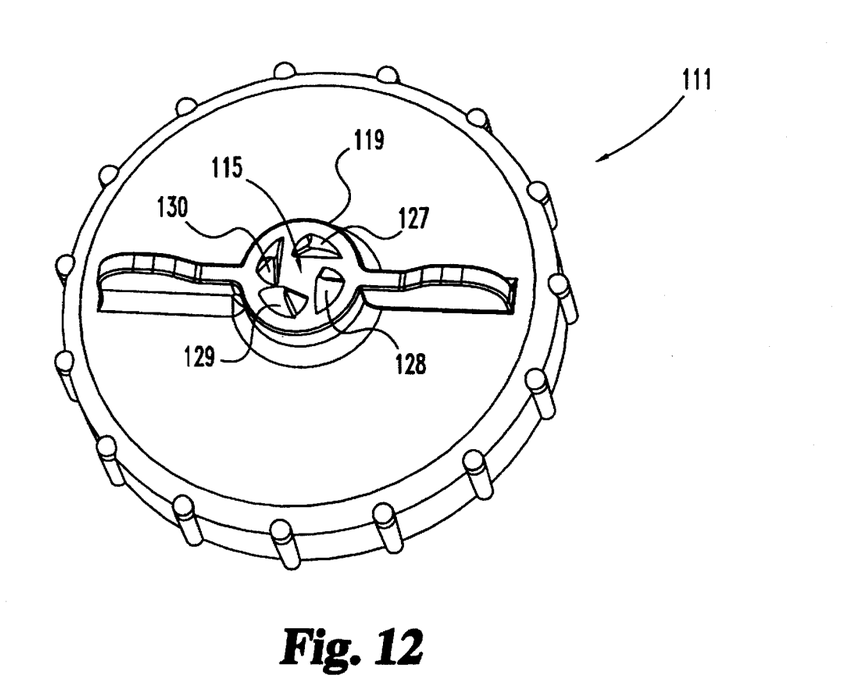
FIG. 12 is a perspective view of an alternative canister lid embodiment according to the present invention.

In FIG. 12, there is no surrounding outer wall for recess 115 which results in the appearance of not having any recess. The four projections 127–130 are virtually identical to projections 33–36. Since these four projections 127–130 are full three dimensional forms, the appearance of boss 119 corresponds to the appearance of modified head 21 and performs in a virtually identical fashion.

Figure 13:
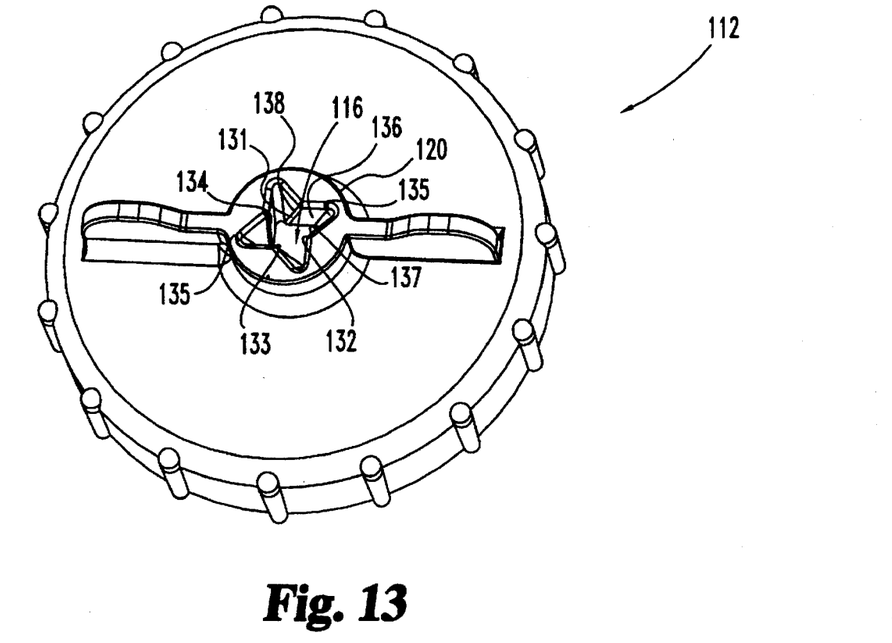
FIG. 13 is a perspective view of an alternative canister lid embodiment according to the present invention.

Referring to FIG. 13, lid 112 includes boss 120 and recess 116 which is designed with projections 131–134. The arrangement of recess 116 is similar to that illustrated in FIG. 11 for recess 86. The only difference between FIGS. 11 and 13 is the specific geometry of the four projections. Otherwise, the construction and theory of operation for lid 112 is the same as lid 82. As to the specific differences relating to the geometry of the two sets of projections, the arrangement of projections 131–134 results in a tighter inside radius 135 between adjacent projections than what is seen in FIG. 11. The radius is continuous from the flat wall 136 of one projection 131 to the relief wall 137 of the adjacent projection 132. Additionally, the angle of the inclined wall portion 138 of lid 112 in FIG. 13 is changed from the angle of lid 82. As previously explained, a steeper angle on the inclined wall portion creates a larger vertical component and if a square drive is used to try and install the lid on the corresponding canister, a higher tightening torque will be generated before the square drive pops out of the corresponding recess. By reducing the angle of incline, there is less torque before the square drive pops out of the recess.

Another difference between recess 116 and recess 86 is the depth of the recess. By providing a greater depth for the recess 116 in FIG. 13, the loosening torque which can be applied to lid 112 is greater. At this point it should be noted, and as would be understood, that the projections which are included as part of each recess of each of the illustrated lids may be designed for clockwise advancing by a square drive or counterclockwise removal by a square drive. Since the intended application for the illustrated lids is the closing of a canister by manually threading the lid onto the canister, all of the projection arrangements which are included as part of these alternate embodiments are designed for counterclockwise removal by means of a square drive.

Figure 14:
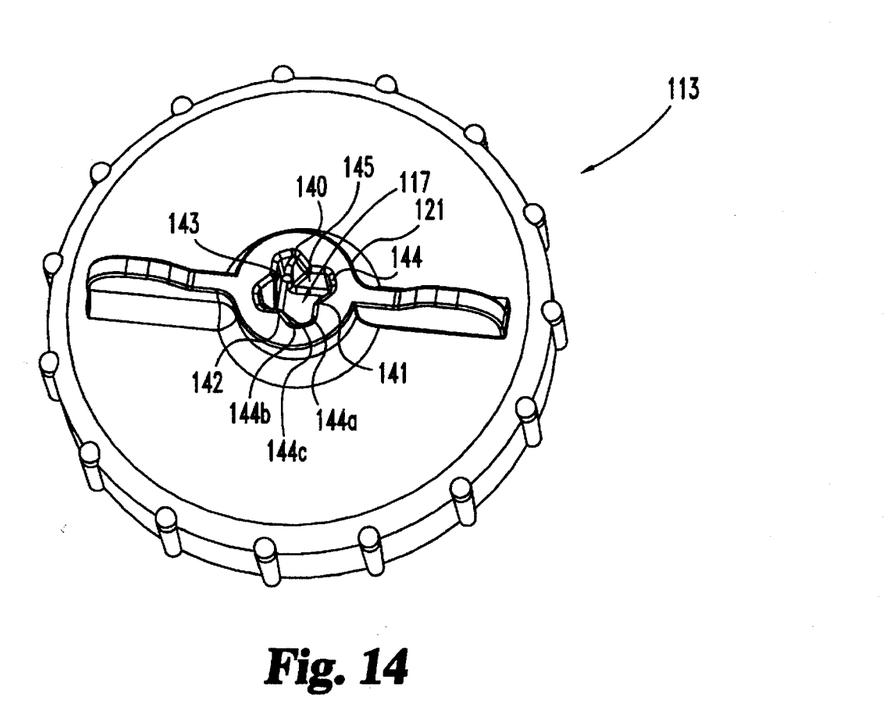
FIG. 14 is a perspective view of an alternative canister lid embodiment according to the present invention.

With regard to FIG. 14, lid 113 includes raised boss 121 and corresponding recess 117. The four projections 140–143 are sized, shaped, and arranged within recess 117 in a manner very similar to projections 131–134 in recess 116. The primary difference is the defined interior corner 144 between adjacent projections which is configured in three sections in the FIG. 14 embodiment. There are actually two radiused sections 144a and 144b which are separated by flat section 144c. This style is repeated at four equally spaced locations between adjacent projections. As can be seen in the illustrated embodiment, the flat wall 145 compared to flat wall 136 has a different geometry.

Figures 15, 15A, 15B:
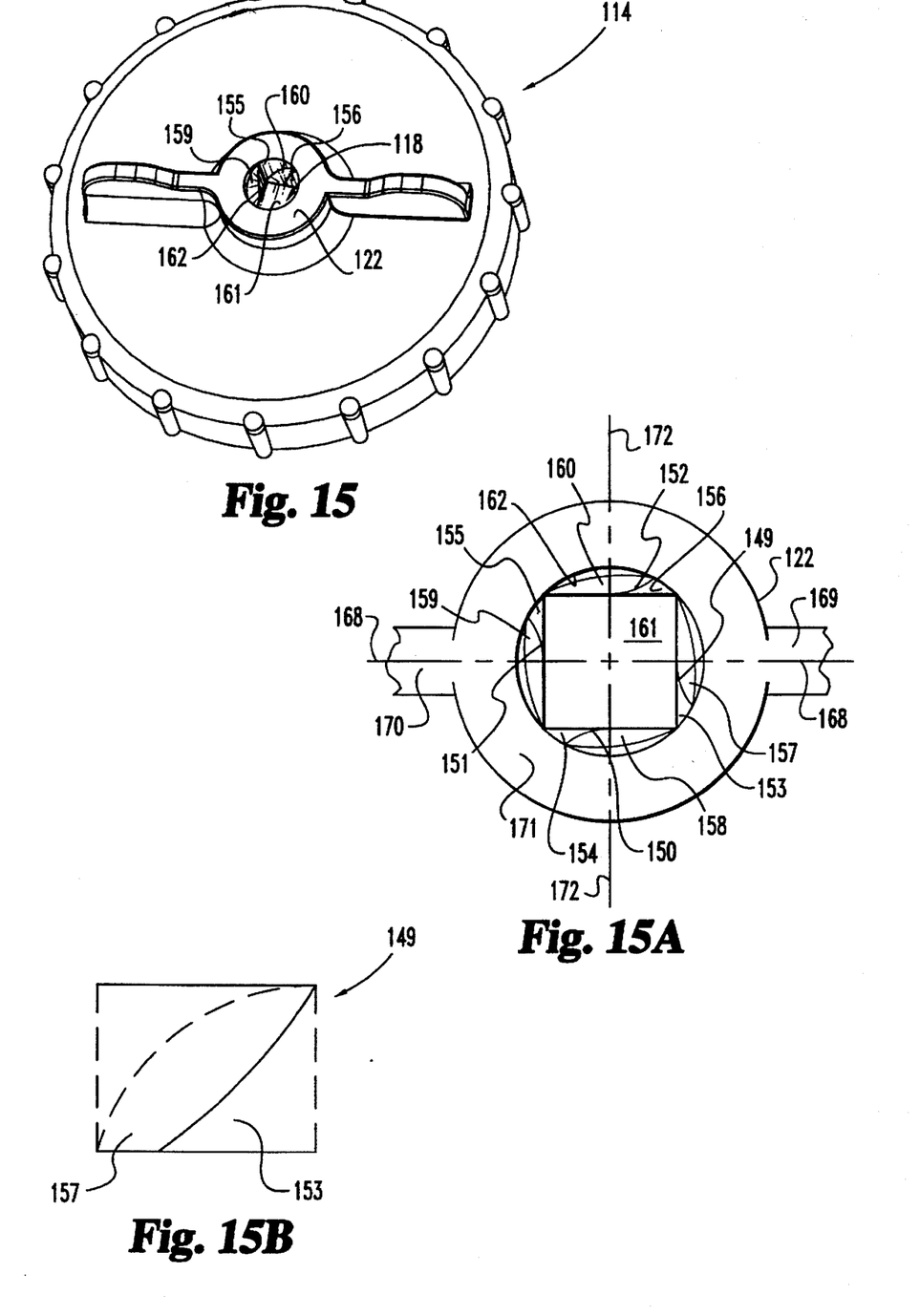
FIG. 15 is a perspective view of an alternative canister lid embodiment according to the present invention.
FIG. 15A is a top plan view of the raised boss portion of the FIG. 15 canister lid.
FIG. 15B is a diagrammatic front elevational view of one of the four sides disposed within the FIG. 15A raised boss.

One of the considerations in the design and selection of a specific style of projection is the relative ease or difficulty in creating the desired shapes inside the corresponding recess. As will be understood, certain geometries are easier to create than others. The final variation to be described is illustrated in FIGS. 15, 15A, and 15B wherein lid 114 includes raised boss 122 and corresponding recess 118. The recess 118 is shaped with four projections whose specific geometry is unique and which results in a very low pop out torque. The various curvatures and the gradual geometry to the inclined wall portions means that the square drive will ride out or pop out of the recess at a very low torque level. In this way, there is very little tightening torque which could be applied to the lid if one tried to use a square drive to advance the lid onto the canister.

Consistent with the other embodiments of the present invention, the raised boss 122 is shaped with four inwardly-directed projections 149–152 each of which includes a corresponding flat wall 153–156 and a corresponding inclined wall 157–160. Recess 118 can be visualized as a blind hole with a square lower floor 161 and a circular top edge 162. The four projections 149–152 extend from the lower floor 161 to the top edge 162. It is the geometry of the flat walls 153–156 and the inclined walls 157–160 which cooperate to create the transition from the square lower floor 161 to the circular top edge 162. One projection 149 is illustrated in FIG. 15B and projection 149 is virtually identical to each of the other three projections. As will be noted from the illustration, these four projections are positioned with respect to each other approximately 90 degrees apart.

If an imaginary geometric plane is superimposed coincident with each flat wall 153–156, the four geometric planes will intersect each other and their intersections will define an interior pocket which is of a suitable size and shape to receive a square drive. This defined pocket has a substantially square shape in lateral section where the cutting plane is substantially parallel to lower floor 161. While the height or depth of this defined pocket can take on virtually any size, in the preferred embodiment it is approximately 0.56 inches in axial distance. As will be understood from this description, a square drive inserted into recess 118 will abut up against flat walls 153–156 when the square drive is turned in a counterclockwise direction. If the square drive is turned in a clockwise direction, the sides of the square drive ride up over the lower portion of each inclined wall 157–160 and from there the square drive continues to ride up each inclined wall such that the square drive actually pops out or rides up and out of recess 118 after approximately 90 degrees of rotation. As a result, the square drive is ineffective in advancing or tightening the lid onto the corresponding canister.

An easy way to visualize the interior geometry of recess 11B and the geometry of each projection 149–152 is to understand how the recess and projections may be formed. To begin, consider imaginary line 168 which passes through the centerline plane of handles 169 and 170. Assume that line 168 lies on the top surface 171 of raised boss 122. Next, consider imaginary line 172 which is perpendicular to line 168, passes through the center of lid 114, and lies on the lower floor 161.

The first step in the visualization procedure is to assume that there is, as a beginning point, no recess 118 and that the raised boss 122 is a solid cylinder. Next, visualize the milling of a square cavity down into the solid boss such that the square cavity has a geometric center which corresponds with the geometric center of lid 114. Further assume that the sides of the square cavity are parallel and perpendicular to imaginary line 168. In the preferred embodiment, this square cavity which is milled into the solid raised boss measures approximately 0.51 inches on a side and its initial depth into the raised boss is approximately 0.02 inches. The next step in the process is to mill another square cavity down into the raised boss starting from the lowest level of the previous cavity. The depth of this second square cavity which is milled into the raised boss is again 0.02 inches. However, the orientation of this second square cavity is shifted slightly from the first square cavity such that the second square cavity is rotated in a counterclockwise direction from the first square cavity by approximately 3.2 degrees. This means that there will be a total of approximately 28 individual milled square cavities over 90 degrees of rotation. At a depth of 0.02 inches per cavity, the total depth of the 28 individual milled cavities is 0.56 inches.

The foregoing description involving 28 individual milled cavities would clearly create a stairstep series of incremental edges and contours. However, if the incremental depth of 0.02 inches and the incremental rotational movement of 3.2 degrees are decreased proportionately, down to some very small numbers, then the number of square cavities will increase and the stairstep edges will take on a desirable smoothing. Obviously if the depth and rotation numbers are decreased substantially, such that the number of cavities increases substantially, it is possible to create a smooth and continuous contour for the inclined walls 157–160.

Another way to visualize the interior geometry of recess 118 is to begin with a square cavity which is approximately 0.56 inches in depth and which measure approximately 0.51 inches on a side. The next step is to insert a square socket drive down into this cavity such that there is approximately a line-to-line fit between the square socket drive and the walls of the square cavity. With such a fit, it is clear that the square socket drive cannot turn within the square cavity in either direction. However, if we assume that the square socket drive will behave much like a cutting tool such that any material which blocks or interferes with the movement of the square socket drive will be removed or eliminated, then we have the choice of turning the square socket drive in either direction. As indicated, as the square socket drive rotates, visualize that the interfering or abutting material is removed. Next, assume that we turn the square socket drive/cutting tool in a clockwise direction and as we rotate the square socket drive in the clockwise direction, we also gradually withdraw the square socket drive from the recess. So long as the rotation and the withdrawal are uniform and proportional, the 90 degrees of rotation will be traveled by the square socket drive while the depth of 0.56 inches is traveled. The material which is "removed" in this imaginary visualization process comes from the relief areas disposed between the inclined wall (157–160) of one projection and the flat wall of the adjacent projection, moving in a counterclockwise direction. The path which the square socket drive/cutting tool sweeps in a clockwise direction as it is turned 90 degrees and as it is withdrawn from the recess is the same path which the square socket drive travels in the FIG. 15 embodiment.

Although one embodiment of the present invention involves a threaded fastener and alternative embodiments involve various threaded lid designs, the socket designs of the present invention may be used with components that are not threaded. One example would be use of the present invention on a component with a quarter-turn bayonet retaining mechanism.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A component which is constructed to be turned in one direction by a drive tool, said component comprising:
   a component body; and
   a component drive portion integral with said component body, said component drive portion including a base and four circumferentially-spaced projections, each projection including a substantially flat wall portion, a ramp portion and a relief wall portion, the ramp portion being positioned between the substantially flat wall portion and the relief wall portion, said four flat wall portions being constructed and arranged to define a drive recess which is substantially centered relative to said base, said four flat wall portions providing abutment surfaces for said drive tool to contact for turning of said component in a first direction, said four ramp portions providing cam surfaces which are constructed to direct the drive tool up and out of the drive recess in order to prevent the turning of said component by said drive tool in a second direction which is the reverse of said first direction.

2. The component of claim 1 wherein the component is a threaded fastener and the component body is an externally threaded fastener stem.

3. The component of claim 1 wherein each of said four ramp portions extends in an upwardly, inclined direction away from said base.

4. The component of claim 3 wherein each of said four ramp portions has an outer surface which is curved.

5. The component of claim 1 wherein said component is an internally-threaded, annular lid.

6. The component of claim 5 which further includes a raised boss having an upper surface and wherein said upper surface coincides with the base of said component drive portion.

7. The component of claim 5 which further includes a raised boss having an upper surface and wherein said component drive portion is recessed below said upper surface.

8. The component of claim 7 wherein said base is substantially square.

9. The component of claim 7 wherein said recessed component drive portion includes a plurality of curved wall portions, each one extending in one direction between said base and said upper surface and each one extending in a second direction from the flat wall portion of one projection in the direction of the ramp portion of an adjacent projection.

10. The component of claim 9 wherein each of said plurality of curved wall portions has a continuous curvature.

11. The component of claim 9 wherein each of said plurality of curved wall portions has a curved portion bounded on each side by substantially flat wall portions.

12. The component of claim 2 wherein said threaded fastener includes a modified head at one end of said fastener stem, said modified head including said component drive portion.

13. The component of claim 12 wherein each of said four ramp portions extends in an upwardly, inclined direction away from said base.

14. The component of claim 13 wherein each of said four ramp portions has an outer surface which is curved.

15. A component which is constructed to be turned in one direction by a drive tool, said component comprising:
   a component body; and
   a component drive portion integral with said component body, said component drive portion including a base and a plurality of circumferentially-spaced projections, each projection including a substantially flat wall portion, a ramp portion and a relief wall portion, the ramp portion being positioned between the substantially flat wall portion and the relief wall portion, said plurality of flat wall portions being constructed and arranged to define a drive recess which is substantially centered relative to said base, said plurality of flat wall portions providing abutment surfaces for said drive tool to contact for turning of said component in a first direction, said plurality of ramp portions providing cam surfaces which are constructed to direct the drive tool up and out of the drive recess in order to prevent the turning of said component by said drive tool in a second direction which is the reverse of said first direction.

16. The component of claim 15 wherein the component is a threaded fastener and the component body is an externally threaded fastener stem.

17. The component of claim 16 wherein said threaded fastener includes a modified head at one end of said fastener stem, said modified head including said component drive portion.

18. The component of claim 17 wherein each of said plurality of ramp portions extends in an upwardly, inclined direction away from said base.

19. The component of claim 18 wherein each of said plurality of ramp portions has an outer surface which is curved.

20. The component of claim 15 wherein each of said plurality of ramp portions extends in an upwardly, inclined direction away from said base.

21. The component of claim 20 wherein each of said plurality of ramp portions has an outer surface which is curved.

22. The component of claim 15 wherein said component is an internally-threaded, annular lid.

23. The component of claim 22 which further includes a raised boss having an upper surface and wherein said upper surface coincides with the base of said component drive portion.

24. The component of claim 22 which further includes a raised boss having an upper surface and wherein said component drive portion is recessed below said upper surface.

25. The component of claim 24 wherein said base is substantially square.

26. The component of claim 24 wherein said recessed component drive portion includes a plurality of curved wall portions each one extending in one direction between said base and said upper surface and each one extending in a second direction from the flat wall portion of one projection in the direction of the ramp portion of an adjacent projection.

27. The component of claim 26 wherein each of said plurality of curved wall portions has a continuous curvature.

28. The component of claim 26 wherein each of said plurality of curved wall portions has a curved portion bounded on each side by substantially flat wall portions.

29. A threaded fastener which is constructed to be turned in one direction by a socket drive, said threaded fastener comprising:
   an externally threaded fastener stem; and
   a modified head positioned at one end of said fastener stem and including a threaded fastener socket, said threaded fastener socket being integral with said threaded fastener stem, said threaded fastener socket including a base and four circumferentially-spaced, raised projections extending beyond said base, each raised projection including a substantially flat wall portion and a ramp portion, each of said four ramp portions extending in an upwardly, inclined direction away from said base and each of said four ramp portions including an outer surface which is curved, said four flat wall portions being constructed and arranged to define a socket recess which is substantially centered relative to said base, said four flat wall portions providing abutment surfaces for said socket drive to contact for turning of said component in a first direction, said four ramp portions providing cam surfaces which are constructed to direct the socket drive up and out of the socket recess in order to prevent the turning of said component by said socket drive in a second direction which is the reverse of said first direction.

30. A component which is constructed to be turned in one direction by a socket drive, said component comprising:
   a component body; and
   a component socket integral with said component body, said component socket including a base and four circumferentially-spaced, raised projections extending beyond said base, each raised projection including a substantially flat wall portion and a ramp portion, each of said four ramp portions extending in an upwardly, inclined direction away from said base and each of said four ramp portions including an outer surface which is curved, said four flat wall portions being constructed and arranged to define a socket recess which is substantially centered relative to said base, said four flat wall portions providing abutment surfaces for said socket drive to contact for turning of said component in a first direction, said four ramp portions providing cam surfaces which are constructed to direct the socket drive up and out of the socket recess in order to prevent the turning of said component by said socket drive in a second direction which is the reverse of said first direction.

31. A threaded, annular lid which is constructed to be turned in one direction by a socket drive, said annular lid comprising:
   an annular lid body; and
   an annular lid socket integral with said annular lid body, said annular lid socket including a base and four circumferentially-spaced, raised projections extending beyond said base, each raised projection including a substantially flat wall portion and a ramp portion, said four flat wall portions being constructed and arranged to define a socket recess which is substantially centered relative to said base, said four flat wall portions providing abutment surfaces for said socket drive to contact for turning of said annular lid in a first direction, said four ramp portions providing cam surfaces which are constructed to direct the socket drive up and out of the socket recess in order to prevent the turning of said annular lid by said socket drive in a second direction which is the reverse of said first direction.

32. A threaded, annular lid which is constructed to be turned in one direction by a socket drive, said annular lid comprising:

a annular lid body; and a annular lid socket integral with said annular lid body, said annular lid socket including a base and four circumferentially-spaced projections, each projection including a substantially flat wall portion and a ramp portion, said four flat wall portions being constructed and arranged to define a socket recess which is substantially centered relative to said base, said four flat wall portions providing abutment surfaces for said socket drive to contact for turning of said annular lid in a first direction, said four ramp portions providing cam surfaces which are constructed to direct the socket drive up and out of the socket recess in order to prevent the turning of said annular lid by said socket drive in a second direction which is the reverse of said first direction.

33. A threaded fastener which is constructed to be turned in one direction by a socket drive, said threaded fastener comprising:

an externally threaded fastener stem; and a modified head positioned at one end of said fastener stem and including a threaded fastener socket, said threaded fastener socket being integral with said threaded fastener stem, said threaded fastener socket including a base and a plurality of circumferentially-spaced, raised projections extending beyond said base, each raised projection including a substantially flat wall portion and a ramp portion, each of said plurality of ramp portions extending in an upwardly, inclined direction away from said base and each of said plurality of ramp portions including an outer surface which is curved, said a plurality of flat wall portions being constructed and arranged to define a socket recess which is substantially centered relative to said base, said plurality of flat wall portions providing abutment surfaces for said socket drive to contact for turning of said component in a first direction, said plurality of ramp portions providing cam surfaces which are constructed to direct the socket drive up and out of the socket recess in order to prevent the turning of said component by said socket drive in a second direction which is the reverse of said first direction.

34. A component which is constructed to be turned in one direction by a socket drive, said component comprising:

a component body; and a component socket integral with said component body, said component socket including a base and four circumferentially-spaced, raised projections extending beyond said base, each raised projection including a substantially flat wall portion and a ramp portion, each of said plurality of ramp portions extending in an upwardly, inclined direction away from said base and each of said plurality of ramp portions including an outer surface which is curved, said four flat wall portions being constructed and arranged to define a socket recess which is substantially centered relative to said base, said four flat wall portions providing abutment surfaces for said socket drive to contact for turning of said component in a first direction, said plurality of ramp portions providing cam surfaces which are constructed to direct the socket drive up and out of the socket recess in order to prevent the turning of said component by said socket drive in a second direction which is the reverse of said first direction.

35. A threaded, annular lid which is constructed to be turned in one direction by a socket drive, said annular lid comprising:

an annular lid body; and an annular lid socket integral with said annular lid body, said annular lid socket including a base and a plurality of circumferentially-spaced, raised projections extending beyond said base, each raised projection including a substantially flat wall portion and a ramp portion, said plurality of flat wall portions being constructed and arranged to define a socket recess which is substantially centered relative to said base, said plurality of flat wall portions providing abutment surfaces for said socket drive to contact for turning of said annular lid in a first direction, said plurality of ramp portions providing cam surfaces which are constructed to direct the socket drive up and out of the socket recess in order to prevent the turning of said annular lid by said socket drive in a second direction which is the reverse of said first direction.

36. A threaded, annular lid which is constructed to be turned in one direction by a socket drive, said annular lid comprising:

a annular lid body; and a annular lid socket integral with said annular lid body, said annular lid socket including a base and a plurality of circumferentially-spaced projections, each projection including a substantially flat wall portion and a ramp portion, said plurality of flat wall portions being constructed and arranged to define a socket recess which is substantially centered relative to said base, said plurality of flat wall portions providing abutment surfaces for said socket drive to contact for turning of said annular lid in a first direction, said plurality of ramp portions providing cam surfaces which are constructed to direct the socket drive up and out of the socket recess in order to prevent the turning of said annular lid by said socket drive in a second direction which is the reverse of said first direction.

37. A component which is constructed to be turned in one direction by a square socket drive, said component comprising:

a component body; and a component socket integral with said component body, said component socket including a base and four circumferentially-spaced projections, each projection including a substantially flat wall portion and a ramp portion, said four flat wall portions being constructed and arranged to define a square socket recess which is substantially centered relative to said base, said four flat wall portions providing abutment surfaces for said square socket drive to contact for turning of said component in a first direction, said four ramp portions providing cam surfaces which are constructed to direct the square socket drive up and out of the square socket recess in order to prevent the turning of said component by said square socket drive in a second direction which is the reverse of said first direction.

* * * * *

UNITED STATES PATENT AND TRADEMARK OFFICE
CERTIFICATE OF CORRECTION

PATENT NO. : 5,647,712
DATED : July 15, 1997
INVENTOR(S) : A. Caner Demirdogen, et al.

It is certified that error appears in the above-identified patent and that said Letters Patent is hereby corrected as shown below:

In Col. 12, at line 64, replace "11B" with --118--.

Signed and Sealed this

Twenty-third Day of September, 1997

Attest:

BRUCE LEHMAN

Attesting Officer

Commissioner of Patents and Trademarks